W. L. EARING.

Improvement in Saws.

No. 120,633.

Patented Nov. 7, 1871.

Witnesses:
P. C. Dieterich
Francis F. McArdle

Inventor:
W. L. Earing
Per Munn & Co
Attorneys.

UNITED STATES PATENT OFFICE.

WILLIAM L. EARING, OF OSWEGO, NEW YORK.

IMPROVEMENT IN SAWS.

Specification forming part of Letters Patent No. 120,633, dated November 7, 1871.

*To all whom it may concern:*

Be it known that I, WILLIAM L. EARING, of Oswego, in the county of Oswego and State of New York, have invented a new and useful Improvement in Combined Circular Saw and Planer; and I do hereby declare that the following is a full, clear, and exact description thereof, which will enable others skilled in the art to make and use the same, reference being had to the accompanying drawing forming part of this specification.

My object in the present invention is to provide means for smoothing the sides of shingle-heading or lumber as such articles are sawed; and my invention consists in the improvement of rotary saws, as hereinafter fully described and subsequently pointed out in the claim.

Figure 1:
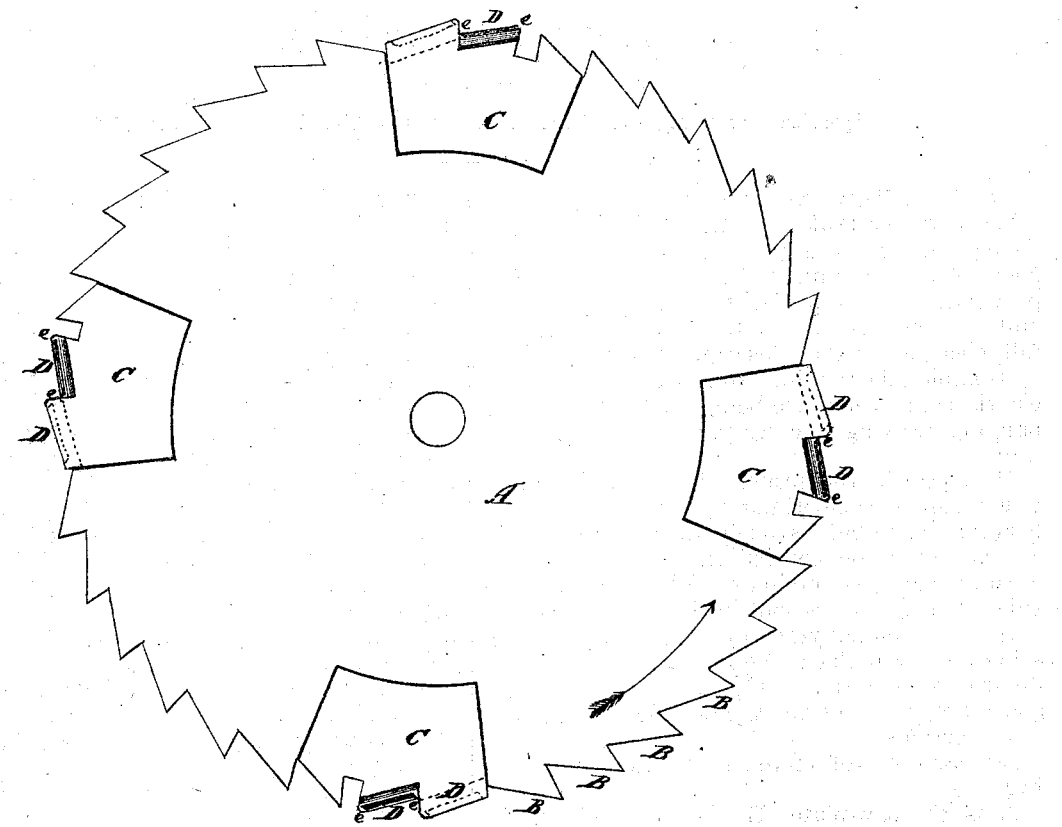
Figure 2:
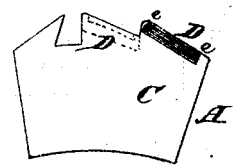

In the accompanying drawing, Figure 1 represents the saw with cutting-knives formed according to my invention. Fig. 2 is a section of the saw-plate, showing the reverse side of one of the knife-sections.

Similar letters of reference indicate corresponding parts.

A is the saw-plate; B, the saw-teeth, made thinner than the knife-plates. C are the cutting-sections, consisting of one or more knives, which, in the drawing, are marked D. The knives D have chisel edges, and, as seen in the drawing, there are two knives to a section, with the edges reversed, so that they cut upon each side of the saw-kerf as the saw passes through the timber, thus smoothing the sides of the articles manufactured. The saw revolves as indicated by the arrow. The upper points of the cutter are slightly below the points of the saw-teeth, and the lower points are supported by shoulders, and the saw-teeth are set or swaged so that their points are a trifle less in thickness than the knife-plates, thus giving the teeth clearance, thereby diminishing the friction. The knives and their teeth thus placed will cut a less kerf than any saw now used of the same thickness of the knife-plates, thereby effecting a material saving in lumber. *e* represents a lip at the rear or highest point of cutting-knives, which separates the shaving at the base, leaving it entirely free in the kerf.

I do not confine myself to any particular number of sections or cutters on a saw. The number depends upon the diameter of the saw. As seen in the drawing, the heel of the knife precedes the point which gives a drawing smooth cut, rendering the shingle-heading or piece of lumber more marketable than it would otherwise be, besides, in many cases, very materially lessening the labor in preparing the lumber for use.

Having thus described my invention, I claim as new and desire to secure by Letters Patent—

The knife-plates C, having knives D provided with a lip in the rear thereof, to prevent the shavings from being left fast to the timber.

WILLIAM L. EARING.

Witnesses:
J. SHEPARD FITCH,
A. M. ROBINSON, Jr.

(131)